Aug. 15, 1944.   G. F. ROQUEMORE   2,356,005
METHOD OF ADHERING GELATIN COATING TO METAL
Filed Nov. 3, 1942

Inventor
Glen F. Roquemore

By
Attorney

Patented Aug. 15, 1944

2,356,005

UNITED STATES PATENT OFFICE 2,356,005

METHOD OF ADHERING GELATINE COATINGS TO METAL

Glen F. Roquemore, Akron, Ohio, assignor to Wingfoot Corporation, Akron, Ohio, a corporation of Delaware Application November 3, 1942, Serial No. 464,425

4 Claims. (Cl. 117—75)

This invention relates to a method of adhering a gelatine-glycerine composition to metal, and the resulting products, such as printers' rolls, etc. Although the invention includes the adherence of gelatine-glycerine compositions to the joints of airplanes for calking, etc., the invention will be described more particularly in connection with printers' rolls.

There are many gelling gelatine-glycerine compositions on the market which are sold for printers' rolls. Although composed essentially of gelatine and glycerine, they may contain water, sugar, etc., as modifiers. One suitable composition contains, for example, 100 parts of glue, 250 parts of glycerine, and 100 parts of water. Instead of, or as replacing a part of the glycerine some compositions comprise other polyhydric alcohols, such as ethylene glycol, polyglycerine, etc. The gelatine may be a reclaimed glue, blood glue, bone glue, hide glue, purified gelatine, etc. Any such compound which may be used for printers' rolls is included in this invention.

The adhesive used is a solution in an organic solvent of a mixture of diisocyanate and an elastoplastic, such as Buna N (a copolymer of butadiene and acrylonitrile), Buna S (a copolymer of butadiene and styrene), rubber, etc. Buna N is insoluble in most organic solvents and is, therefore, preferred for use around printing inks, etc., where such solvents are employed.

Any organic diisocyanate, either aliphatic or aromatic, may be used, including para phenylene diisocyanate, meta phenylene diisocyanate, the diphenylene diisocyanates, methylene di(para phenylene isocyanate), ethylene di(oxy trimethylene isocyanate), and the diisocyanates of other glycol ethers, the diisocyanates of propyl ethers, toluylene diisocyanates, the dimethyl phenylene diisocyanates, the naphthyl diisocyanates, the diisocyanates of dioxane, hexamethylene diisocyanate, etc. The diisocyanates may be prepared by treating a solution of the corresponding diamine with an excess of hydrogen chloride and then introducing phosgene into the resulting mixture of precipitated amine hydrochloride and solvent.

Figure 1:
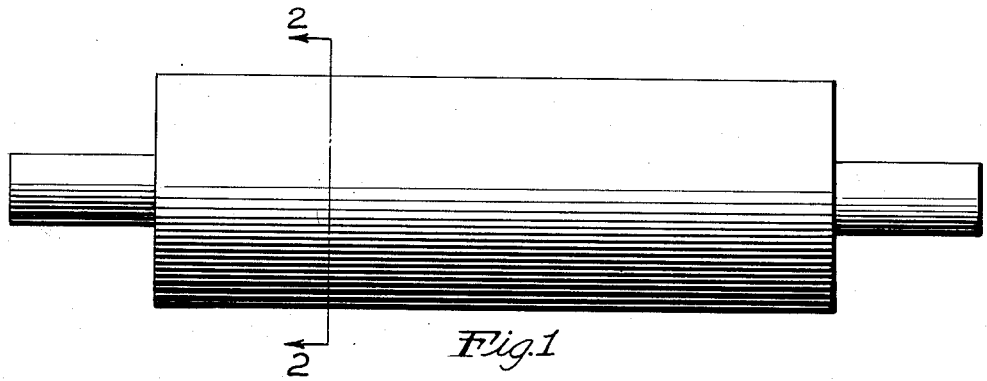
Figure 2:
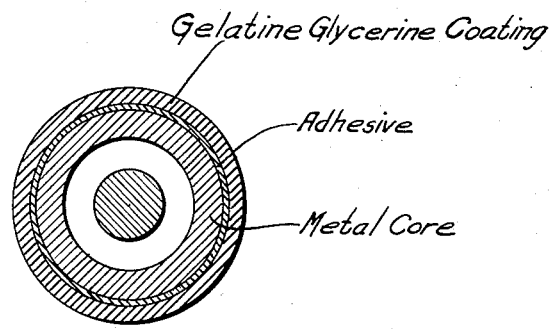

The invention will be further described in connection with the accompanying drawing in which Fig. 1 is a side view of a printers' roll, and Fig. 2 is a section on the line 2—2 of Fig. 1.

The core of the roll may be steel, brass, nickel, aluminum, copper or any structural metal. It is not necessary that all grease and rust (if any) be removed before applying the adhesive, but this may be desirable. The adhesive may, for example, contain:

| | Parts |
|---|---|
| Buna N | 110.0 |
| Zinc oxide | 5.0 |
| Sulfur | 3.0 |
| Stearic acid | 0.5 |
| Mercaptobenzothiazole | 0.5 |
| Carbon black | 10.0 |
| Phenyl beta naphthylamine | 2.0 |

This is made up to a 20 per cent solution in benzol. Toluol, xylene, etc., might be used. Other curing agents, etc., may be compounded with the plastic, and, of course, there is nothing critical about any of the amounts set forth in the above formula. The black may be omitted entirely. The formula is purely illustrative.

20 grams of methylene di(para phenylene isocyanate) is added per one-half pint of the adhesive. Without the diisocyanate the Buna does not adhere to the metal. Adding more than the given amount of diisocyanate does not appear to improve the adhesion, and if appreciably less is added, the bond formed is weakened. Even a small amount of the diisocyanate improves the adhesion.

The adhesive is applied to the metal, and after evaporation of the solvent, the gelatine-glycerine composition is applied. The article is then set aside at room temperature, or thereabout, to allow the Buna to cure and the gelatine-glycerine to gel.

Since the usual gelatine-glycerine compositions will not withstand any high degree of heat, the adhesive should be one which air-cures. Suitable formulae for air-curing adhesives composed essentially of rubber, Buna S, and other elastoplastics are well-known.

What I claim is:

1. A printers' roll with a surface of a gelled gelatine-glycerine composition, bonded to the metal core of the roll by a mixture of Buna N and an organic diisocyanate.

2. The process of forming a printers' roll which comprises applying an air-curing cement comprising Buna N and an organic diisocyanate to the core of the roll, allowing the solvent of the cement to evaporate, applying a gelatine-glycerine coating and then allowing the Buna to cure and the gelatine-glycerine to gel.

3. A composite article comprising a gelled gelatine-glycerine composition bonded to a structural metal by a mixture of an organic diisocyanate and a material selected from the group consisting of Buna N, Buna S, and rubber.

4. The method of bonding a gelatine-glycerine composition to a structural metal which comprises applying to the metal a solution of an air-curing adhesive containing an organic diisocyanate and a material selected from the group consisting of Buna N, Buna S, and rubber, allowing the solvent to evaporate, then applying the gelatine-glycerine composition and allowing the adhesive to cure while the gelatine-glycerine composition is gelling.

GLEN F. ROQUEMORE.